Dec. 2, 1924.
E. ROTH
1,517,587
FREELY SWINGING SHAKING MECHANISM
Filed Aug. 20, 1923
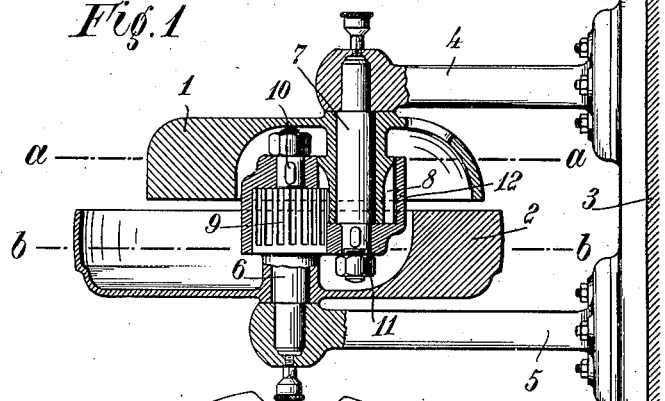
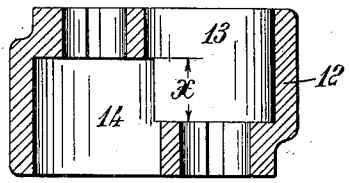
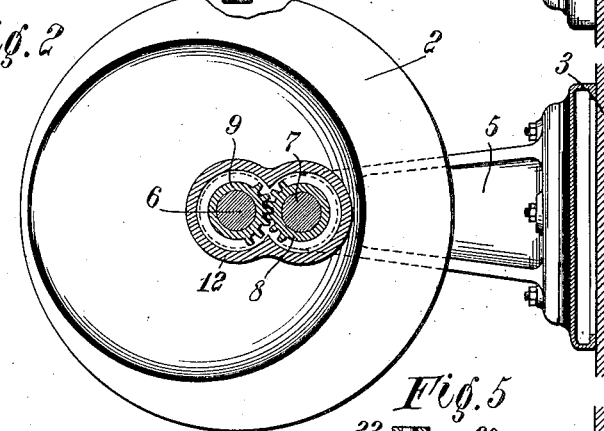
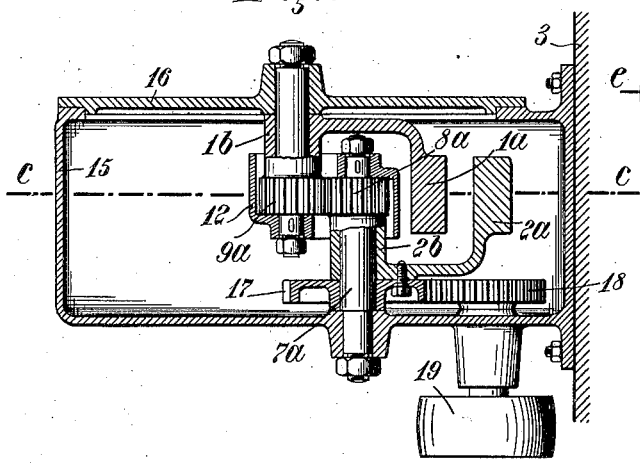
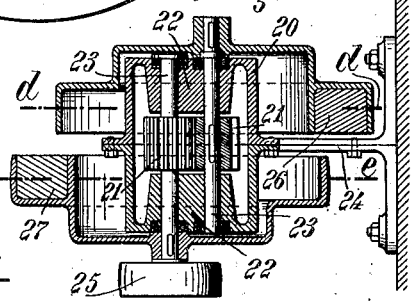
Inventor:
Ernst Roth,
By Henry Ortty
Atty.

Patented Dec. 2, 1924.

1,517,587

UNITED STATES PATENT OFFICE.

ERNST ROTH, OF NIEDERUZWIL, SWITZERLAND, ASSIGNOR TO THE FIRM GEBRÜDER BÜHLER, OF UZWIL, SWITZERLAND.

FREELY-SWINGING SHAKING MECHANISM.

Application filed August 20, 1923. Serial No. 658,407.

*To all whom it may concern:*

Be it known that I, ERNST ROTH, a citizen of the Republic of Switzerland, residing at Niederuzwil, Switzerland, have invented certain new and useful Improvements in Freely-Swinging Shaking Mechanism, of which the following is a specification, reference being had therein to the accompanying drawing.

Freely swinging shaking mechanisms for oscillating machinery are known which comprise two gyrating weights that rotate in opposite directions to each other with the same angular speed and exert the same centrifugal action and are positively driven by means of a pair of gear wheels. In order to prevent the generation of a prejudicial moment on the bearing surfaces and thereby large bearing pressures and extensive wear of those surfaces which drawbacks are caused by the centrifugal forces of the gyrating weights it is contemplated to have the centrifugal forces of the gyrating weights act within the bearing surfaces; with gyrating weights rotating in planes that are at a comparatively great distance from each other there is no difficulty in accomplishing this. The arrangement of the gyrating weights at a great distance from each other presents however several disadvantages, it is therefore the object of the present invention to overcome the above mentioned difficulties inherent to constructions with which the planes of rotation of the gyrating weights are at least near to each other, i. e. are at a very small distance from each other or coincide to form one single plane, by causing the centrifugal forces of the gyrating weights to act within the bearing surfaces. This may be attained according to the present invention by lengthening the hubs of the gyrating weights, in which hubs the bearing surfaces are arranged, towards the planes of rotation, whereby the centrifugal forces act within the bearing surfaces of the bearings. In this manner the centrifugal forces generated by the gyrating weights are directly taken up by the bearing surfaces. In a preferred embodiment two pins serving as journals for the bearings of the gyrating weights are rigidly connected to each other between the weights by a member formed so that the two intermeshing gear wheels, which serve to drive the two gyrating weights, can be inserted from opposite sides to bring them into mesh.

Three constructional examples of the subject matter of the present invention are illustrated on the accompanying drawings, in which:

Fig. 1 is a vertical section through a first constructional example, and

Fig. 2 is a horizontal section of Fig. 1.

Fig. 3 is a detail section, on an enlarged scale;

Fig. 4 is a vertical section through a second constructional example and

Fig. 5 is a vertical section through a third constructional example.

With the embodiment of the invention illustrated in Figs. 1-3, 1 denotes one of the gyrating weights rotating in the plane $a$ and 2 is the other gyrating weight rotating in the plane $b$. The planes $a$ and $b$ are close to each other and the two gyrating weights are shaped to form together a casing like unit. Outside of this unit and of the space between the planes $a$ and $b$ two bearings 4 and 5 respectively are fixed on the machinery part 3 to which oscillatory motion has to be imparted by the gyrating weights. In the free end of each bearing a pin 6 or 7 respectively is mounted with its outer end, the pins extending through the space confined by the planes $a$ and $b$ and their inner ends lying within the other gyrating weights. The latter are loosely mounted upon the bolts 6 or 7 respectively. The hubs of the gyrating weights are built to form bearing surfaces and are so far extended towards the planes $a$ and $b$ respectively that the centrifugal forces act within the bearing surfaces. The hubs are further shaped to form gear wheels 8 and 9 which are in mesh. The gyrating weight 2 acts as a belt pulley and is rotated by means of a belt. In order to fix the positions of the two pins and of the spur gear wheels relatively to each other the two inner ends 10 and 11 of the pins are rigidly connected together by means of a box-like member 12 (Fig. 3). The member 12 is provided with recesses 13 and 14 opening towards opposite sides. The spur gear 9 is inserted in the recess 14 and the spur gear 8 projects into the recess 13, the recesses being so arranged that the spur gears intermesh over a width indicated by the distance $x$ (Fig. 3). The gear wheels can be inserted from opposite sides to bring them into mesh. The space between the two planes $a$ and $b$ may be kept very small. As the centrifugal forces of the gyrating masses act within the bearing surfaces a good distribution of the bearing pressure and a small wear of the bearings is attained. Instead of the spur gear wheels 9 and 8 screw wheels may be used.

In the constructional example illustrated in Fig. 4 the gryating weight $1^a$ forms one integral part with the hub $1^b$ and the spur gear wheel $9^a$, likewise the gyrating mass $2^a$ is integral with the hub $2^b$ and the spur gear wheel $8^a$. By this means a long bearing surface for the gyrating masses is obtained and this bearing surface is very considerably lengthened in the direction towards the gyrating masses. The arrangement of the parts is so chosen that the plane of rotation of the gyrating masses coincides to form one plane $c$. The member 12 provides for the necessary rigidity of the whole system and ensures a proper meshing of the gear wheels. The whole shaking mechanism is inclosed in a casing 15 provided with a cover 16, the casing may serve as a container for lubricating oil. Upon the pin $7^a$ a gear wheel 17 rigidly connected to the gyrating mass $2^a$ is rotatably mounted; the gear wheel 17 cooperates with the gear wheel 18 to which rotation is imparted by a belt pulley 19 arranged outside the casing 15. The latter is fixed to the machinery part 3 to which oscillatory movement has to be imparted.

Another solution of designing the shaking mechanism is illustrated in Fig. 5 in which gear wheels 21 and the bearings 22 of the rotating shaft 23 are enclosed in a small casing 20, the latter being connected by a narrow pedestal 24 to the oscillating machinery part. One of the shafts 23 is provided with a driving pulley 25. The gyrating masses 26 and 27 are so constructed that the planes $d$ and $e$ of rotation of the centrifugal forces are close to each other and that the centrifugal forces act within the bearing surfaces.

With all the above described constructional examples the planes in which the centrifugal forces act are close to each other and the centrifugal forces of the gyrating masses act within the bearing surfaces whereby a favorable distribution of the bearing pressure, small frictional losses and a small wear of the bearings are obtained.

I claim:

1. In a device of the kind described the combination of two gyrating weights adapted to rotate with equal angular speeds in two directions that are opposite to each other and that exert the same centrifugal actions for imparting oscillatory motion to a machinery part, with a pair of intermeshing gear wheels adapted to positively drive said gyrating weights, bearing means for rotatably mounting said gyrating weights and gear wheels including pins serving as axles for said gyrating weights and hubs on said gyrating weights provided with bearing surfaces, and a member arranged between said gyrating weights and serving to hold said pins in determined position and to ensure a proper meshing of the gear wheels, the member permitting the gear wheels to be inserted into it from opposite sides into their meshing position, the gyrating weights and bearing means being so disposed that the planes of rotation of the gyrating weights are at least close to each other and that the hubs are so far lengthened towards said planes that the centrifugal forces act within the bearing surfaces.

2. In a device of the kind described, the combination of two gyrating weights adapted to rotate with equal angular speeds in two directions that are opposite to each other and that exert the same centrifugal actions for imparting oscillatory motion to a machinery part, with a pair of intermeshing gear wheels adapted to positively drive said gyrating weights, bearing means for rotatably mounting said gyrating weights and gear wheels including pins serving as axles for said gyrating weights, said gear wheels being integral with the respective hubs of the gyrating weights, and a member arranged between said gyrating weights and serving to hold said pins in determined position and to ensure a proper meshing of the gear wheels, the member permitting the gear wheels to be inserted into it from opposite sides into their meshing positions, the gyrating weights and bearing means being so disposed that the planes of rotation of the gyrating weights are at least close to each other and that the hubs are so far lengthened towards said planes that the centrifugal forces act within the bearing surfaces.

In testimony whereof I affix my signature.

ERNST ROTH.